(12) United States Patent
Butler et al.

(10) Patent No.: US 9,979,469 B2
(45) Date of Patent: May 22, 2018

(54) INTERPOSER COUPLING ASSEMBLY HAVING AN OPTICAL PATHWAY INCLUDING A GRIN LENS AND RELATED OPTICAL PLUG ASSEMBLIES

(71) Applicant: Corning Optical Communications LLC, Hickory, NC (US)

(72) Inventors: Douglas Llewellyn Butler, Painted Post, NY (US); Ying Geng, Sammamish, WA (US); Micah Colen Isenhour, Lincolnton, NC (US); James Phillip Luther, Hickory, NC (US); Robert Adam Modavis, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days. days.

(21) Appl. No.: 15/040,366

(22) Filed: Feb. 10, 2016

(65) Prior Publication Data
US 2016/0170148 A1 Jun. 16, 2016

Related U.S. Application Data

(63) Continuation of application No. PCT/US2014/049526, filed on Aug. 4, 2014.
(Continued)

(51) Int. Cl.
*G02B 6/36* (2006.01)
*H04B 10/071* (2013.01)
(Continued)

(52) U.S. Cl.
CPC ............ *H04B 10/071* (2013.01); *G02B 6/30* (2013.01); *G02B 6/32* (2013.01); *G02B 6/325* (2013.01);
(Continued)

(58) Field of Classification Search
CPC .. G02B 6/4292; G02B 6/4246; G02B 6/4249; G02B 6/36
See application file for complete search history.

(56) References Cited

U.S. PATENT DOCUMENTS 3,910,677 A 10/1975 Becker et al.
5,039,193 A * 8/1991 Snow .................... G02B 6/262
  385/25
(Continued)

FOREIGN PATENT DOCUMENTS

CN 1393717 A 1/2003
CN 1742218 A 3/2006
(Continued)

OTHER PUBLICATIONS

English Translation of CN201480050842.6 First Search Report dated Dec. 29, 2016; China Patent Office.
(Continued)

*Primary Examiner* — Jennifer Doan
(74) *Attorney, Agent, or Firm* — Michael E. Carroll, Jr.

(57) ABSTRACT

Disclosed are interposer including an interposer coupling assemblies for communicating optical signals to an integrated circuit and other interposer structures having an optical interface for optical connections. In one embodiment, the interposer coupling assembly includes a connector attachment saddle having an optical alignment structure, an optical pathway that includes a GRIN lens, and an optical signal turning element adjacent to the GRIN lens. The interposer coupling assembly may be optically attached to an integrated circuit or a base that is attached to an integrated circuit to form an interposer structure that allows high-speed data transfer. Also disclosed are complimentary optical assemblies that may be optically connected to the interposer coupling assembly.

27 Claims, 13 Drawing Sheets

Related U.S. Application Data

(60) Provisional application No. 61/868,826, filed on Aug. 22, 2013.

(51) Int. Cl.
*G02B 6/42* (2006.01)
*G02B 6/30* (2006.01)
*G02B 6/32* (2006.01)
*G02B 6/38* (2006.01)

(52) U.S. Cl.
CPC ......... *G02B 6/3871* (2013.01); *G02B 6/3882* (2013.01); *G02B 6/3885* (2013.01); *G02B 6/4214* (2013.01); *G02B 6/4225* (2013.01); *G02B 6/4267* (2013.01); *G02B 6/4292* (2013.01); *G02B 6/3898* (2013.01)

(56) References Cited

U.S. PATENT DOCUMENTS

| | | | |
|---|---|---|---|
| 5,168,537 A | 12/1992 | Rajasekharan et al. | |
| 5,259,050 A * | 11/1993 | Yamakawa | G02B 6/3885 385/114 |
| 5,548,677 A | 8/1996 | Kakii et al. | |
| 6,390,690 B1 * | 5/2002 | Meis | G02B 6/3897 385/147 |
| 6,736,546 B2 | 5/2004 | Kiani et al. | |
| 7,603,008 B2 | 10/2009 | Matsumura et al. | |
| 9,039,302 B2 * | 5/2015 | Bowen | G02B 6/425 385/89 |
| 9,217,839 B2 | 12/2015 | Butler et al. | |
| 2003/0215190 A1 * | 11/2003 | Lampert | G02B 6/3821 385/77 |
| 2011/0229083 A1 | 9/2011 | Dainese Júnior et al. | |
| 2012/0163754 A1 | 6/2012 | Benjamin et al. | |
| 2012/0189245 A1 | 7/2012 | Bowen et al. | |
| 2012/0189252 A1 | 7/2012 | Bhagavatula et al. | |
| 2012/0201499 A1 | 8/2012 | Buijs et al. | |
| 2013/0034325 A1 | 2/2013 | Bowen | |
| 2013/0136393 A1 * | 5/2013 | Ishii | G02B 6/30 385/14 |
| 2013/0188970 A1 | 7/2013 | Shastri et al. | |
| 2014/0143996 A1 * | 5/2014 | Bhagavatula | G02B 3/0087 29/428 |

FOREIGN PATENT DOCUMENTS

| | | |
|---|---|---|
| CN | 1910488 A | 2/2007 |
| CN | 101788699 A | 7/2010 |
| CN | 201812061 U | 4/2011 |
| EP | 0895106 A1 | 2/1999 |
| GB | 2497631 A | 6/2013 |
| WO | 2007127916 A2 | 11/2007 |
| WO | 2013086117 A2 | 6/2013 |

OTHER PUBLICATIONS

Patent Cooperation Treaty, International Search Report for PCT/US2014/049526, dated Apr. 9, 2015, 15 pages.

P. Chanclou, C. Kaczmarek, G. Mouzer, O. Gautreau, M. Thual, P. Grosso, "Design and Demonstration of a Multicore Single-Mode Fiber Coupled Lens Device," Optics Communications, vol. 233, Issues 4-6, Apr. 1, 2004, pp. 333-339.

* cited by examiner

INTERPOSER COUPLING ASSEMBLY HAVING AN OPTICAL PATHWAY INCLUDING A GRIN LENS AND RELATED OPTICAL PLUG ASSEMBLIES

RELATED APPLICATION

This application is a continuation of International Application No. PCT/US14/49526, filed on Aug. 4, 2014, which claims the benefit of priority under 35 U.S.C. § 119 of U.S. Provisional Application Ser. No. 61/868,826, filed on Aug. 22, 2013, the content of which is relied upon and incorporated herein by reference in its entirety.

FIELD

The disclosure relates generally to interposer coupling assemblies and interposer structures useful for optical communication with integrated circuits. The interposer coupling assemblies have an optical pathway that includes a GRIN lens and allow an optical connection with a complimentary optical assembly attached to the interposer coupling assembly for optical communication with an integrated circuit.

BACKGROUND

Optical fibers have displaced copper-based connectivity in much of the traditional long-haul and metro telecommunication networks for numerous reasons such as large bandwidth capacity, dielectric characteristics and the like. As higher network speeds for communication networks are required the optical fiber will move deeper into the communication networks toward the electronics located in servers and switches that manage traffic on the communication network. As this migration of optical fiber expands deeper into communication networks new challenges will be encountered for making optical connections to electronics for high-speed communications. By way of example, aligning and maintaining optical alignment for a high-density optical connection with integrated circuits presents unresolved needs for the industry.

SUMMARY

The disclosure is directed to an interposer including an interposer coupling assembly for communicating optical signals to an integrated circuit. The interposer coupling assembly includes a connector attachment saddle having an optical alignment structure, an optical pathway that includes a GRIN lens, and an optical signal turning element adjacent to the GRIN lens. The interposer coupling assembly may be optically attached to an integrated circuit or a base that is attached to an integrated circuit to form an interposer structure that allows high-speed data transfer. In one embodiment, a complimentary optical assembly may be attached to the interposer coupling assembly.

The disclosure is also directed to an optical plug assembly for optical connection with an interposer coupling assembly. The optical plug assembly includes an optical fiber organizer having at least one rotational orientation guide and at least one bore for receiving an optical fiber, a GRIN lens, an attachment body, and an alignment body for receiving a portion of the optical fiber organizer and a portion of the GRIN lens. In one embodiment, the optical plug assembly has one or more multi-core optical fibers attached thereto for providing a relatively dense optical plug connector.

Another aspect of the disclosure is directed to an assembly for communicating optical signals to an integrated circuit. The assembly includes an interposer coupling assembly and an optical plug assembly. The interposer coupling assembly includes a connector attachment saddle with an optical alignment structure, an optical pathway that includes a GRIN lens, and an optical signal turning element adjacent to the GRIN lens. The optical plug assembly is attached to the interposer coupling assembly and the optical plug assembly has one or more multicore optical fibers and a GRIN lens.

The disclosure is further directed to a method of making a coupling assembly. The method includes providing an optical signal turning element, providing a GRIN lens, attaching the GRIN lens to the optical signal turning element, and providing a connector attachment saddle. The coupling assembly may be used for any suitable application and in one embodiment is used for an interposer structure.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
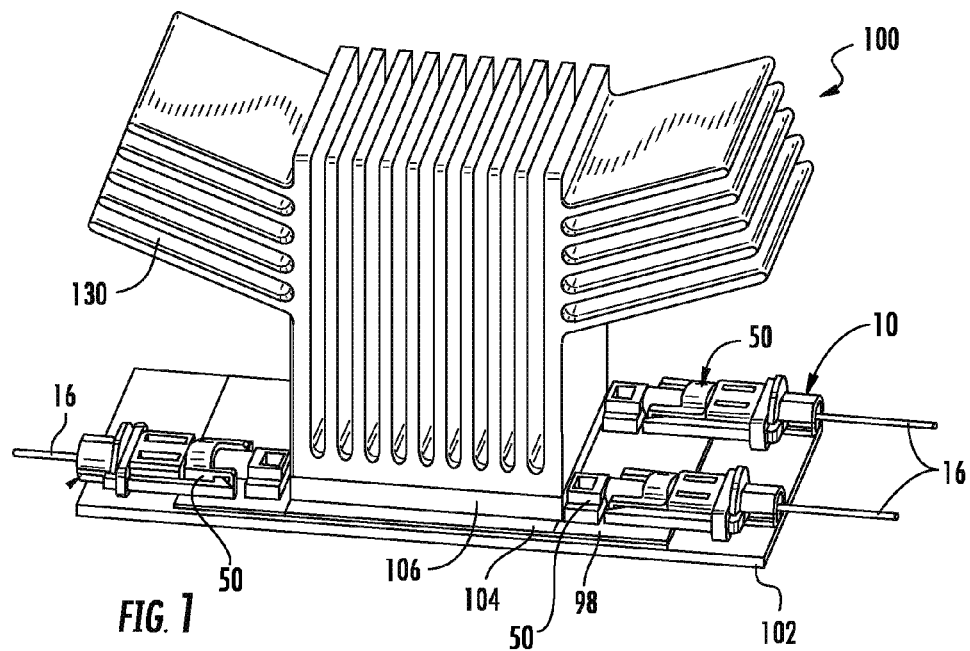
FIG. 1 is a perspective view of an interposer structure having an optical interface for optical connection with one or more optical plug assemblies according to the concepts disclosed herein.

Reference is now made in detail to the present preferred embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

Disclosed are interposer coupling assemblies having an optical connection for communicating optical signals to integrated circuits along with interposer structures and systems that use the interposer coupling assemblies. As used herein, an "interposer" or "interposer integrated circuit" means an optical/electrical integrated circuit (IC) having an optical interface for communicating optical signals and an "interposer structure" means a structure including an interposer or interposer integrated circuit. The interposer coupling assembly concepts disclosed herein may be a portion of any suitable integrated circuit (IC) or formed as a discrete intermediate structure for coupling with an IC as desired. For instance, the interposer coupling assembly may be a portion of one or more ICs having an electrical and/or optical communication interface. Also disclosed are related optical assemblies such as optical plug assemblies for attaching to the interposer coupling assembly. By way of example, the interposer coupling assembly may be a portion of a self-contained IC or in another embodiment, the interposer coupling assembly acts as a signal bridge between the IC connected electrically to a circuit board or the like while also being able to process high-speed optical signals received from the interposer structure via the optical connection. Specifically, the interposer coupling assembly and the related optical assembly cooperate for providing high-speed optical communication links to an electronic device.

Embodiments may have a matched thermal response between materials for maintaining a proper optical alignment between optical paths on the interposer coupling assembly and interposer integrated circuit. The interposer coupling assembly, interposer structures and optical assemblies described herein are advantageous since they provide a robust high-density optical solution that addresses the challenges for providing optical connectivity for an IC or to an IC via the interposer structure. Although embodiments may discuss the interposer coupling assembly as a discrete component from the IC the concepts of the interposer coupling assembly may be integrated as a portion of an IC according to the concepts disclosed. Further, although discussed in the context of an interposer coupling assembly, the concepts of the coupling assembly may be used for other applications as appropriate.

Figure 2:
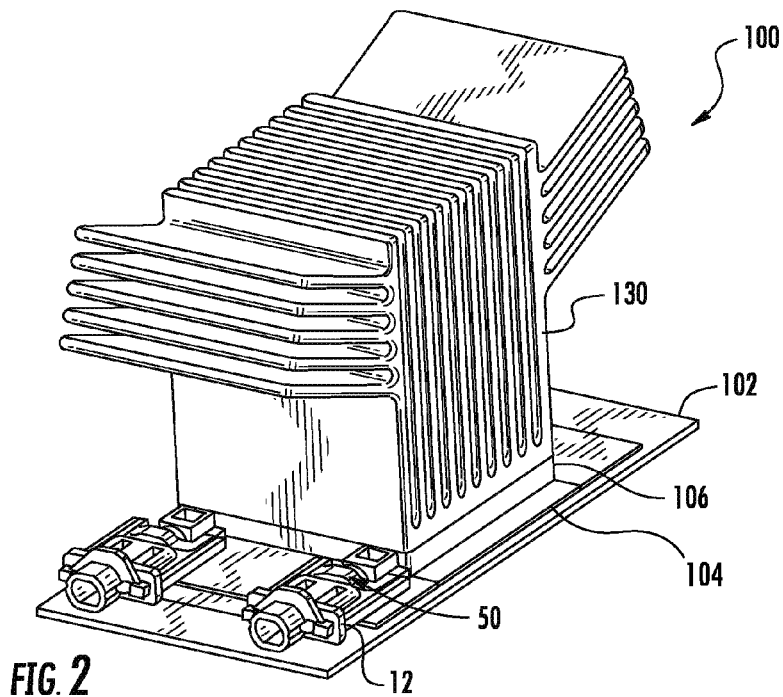
FIG. 2 is another perspective view of the interposer structure of FIG. 1 where the optical fibers are removed from the optical plug assemblies.

FIGS. 1 and 2 are perspective views of an interposer structure 100 having an interposer coupling assembly 50 for communicating optical signals to/from an integrated circuit such as an interposer integrated circuit 104 (hereinafter "interposer IC"). In other words, the interposer structure 100 provides an integrated silicon photonics solution using the interposer coupling assembly 50 for providing optical communication to an integrated circuit (IC) or the like, thereby allowing an optical data connection instead of solely having a conventional copper data connection via an electrical connector. Also shown is an optical plug assembly 10 attached to the interposer coupling assembly 50 for communicating optical signals to and from the interposer structure 100 from another device. In this embodiment, the interposer IC 104 includes a circuit for conversion of optical and electrical signals and is in communication with another IC such as electro-optical circuit 106 such as in electrical communication. However, other embodiments according to the concepts disclosed may not use the electro-optical circuit 106, but instead have all of the desired functionality included in one IC such as the interposer IC 104. As shown, interposer structure 100 includes a circuit board 102, interposer IC 104, and electro-optical circuit 106 along with the interposer coupling assembly 50. The interposer IC 104 and/or electro-optical circuit 106 may be electrically attached to the circuit board 102 and may include communication links therebetween such as electrical connections for signal transfer, power and the like. The interposer structure 100 shown may also optionally include a heat sink 130 such as disposed on the electro-optical circuit 106 for cooling and providing a lower operating temperature for the ICs of the structure, but other cooling arrangements are possible such as other types of heat sinks, cooling fans, etc. FIG. 2 is perspective view of the interposer structure 100 shown from another angle where the optical fibers 16 are removed from a plug 12 of the optical plug assembly 10.

Figure 3:
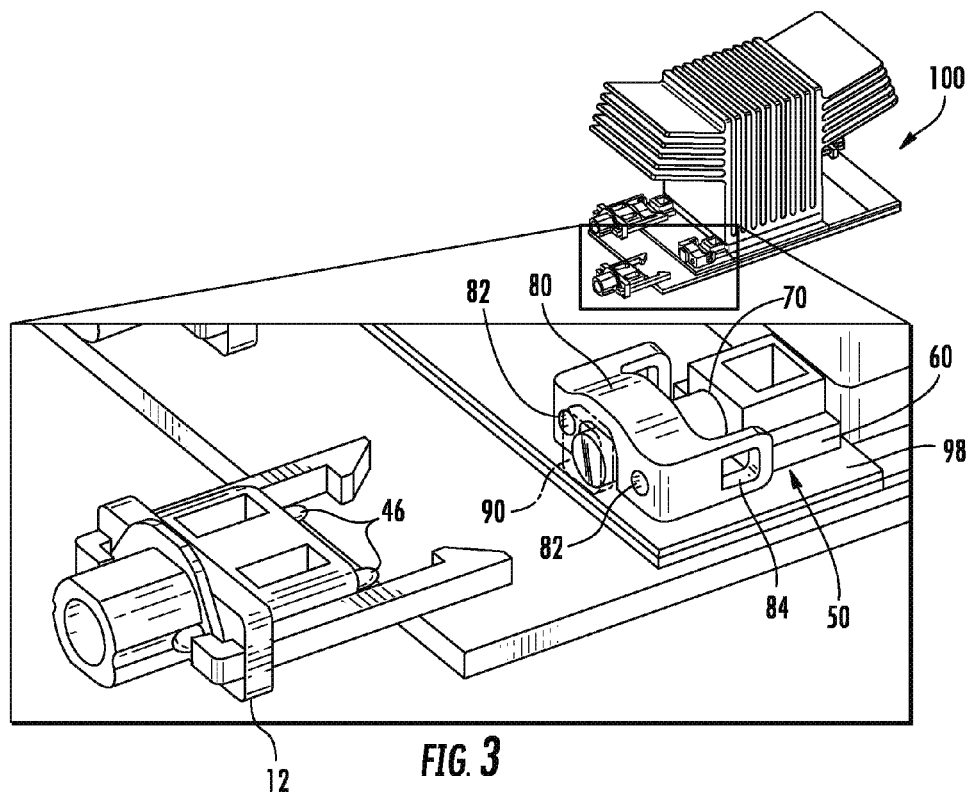
FIG. 3 is a detailed perspective view of an unmated optical connection between the interposer coupling assembly of the interposer structure and the optical plug assembly.
Figure 4:
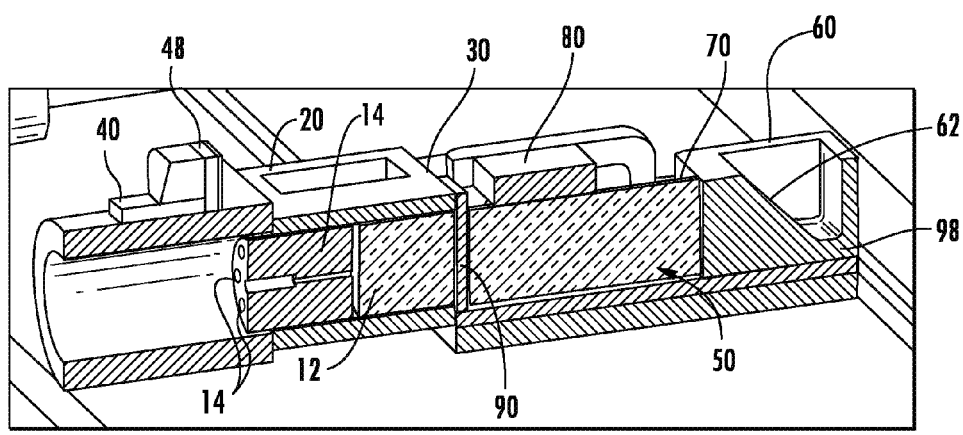
FIG. 4 is a cross-sectional view showing the optical connection between the interposer coupling assembly of the interposer structure and the optical plug assembly.

FIG. 3 is a detailed perspective view showing an unmated optical connection between the interposer coupler assembly 50 of interposer structure 100 and the plug 12 of optical plug assembly 10 and FIG. 4 is a mated cross-sectional view of the optical connection. As depicted, interposer coupler assembly 50 includes an optical turning element 60, an optical pathway having a gradient-index (GRIN) lens 70, and connector attachment saddle 80 that includes an optical alignment structure 82 for precisely aligning optical plug assembly 10 with the optical pathways of the interposer coupler assembly 50 for communication with an integrated circuit such as the interposer IC 104 or other circuit. In this embodiment, optical alignment structure 82 includes one or more bores disposed on opposite sides of the connector attachment saddle 80 for receiving alignment pins of plug 12 for providing optical alignment between the interposer coupler assembly 50 and the plug 12. Connector attachment saddle 80 also includes one or more attachment features 84 for securing plug 12 thereto.

Interposer coupler assembly 50 may also include an optional window 90 (e.g., a non-GRIN material) that allows transmission of the optical signals at the transmitting wavelengths such as between 850-1300 nanometers, but other wavelengths are possible. Window 90 aids the assembly of interposer coupler assembly 50 by providing a mounting reference surface for the connector attachment saddle 80. Window 90 has a suitable thickness and forms a portion of the optical pathway of the interposer coupler assembly 50. Window 90 provides an interface between a GRIN lens 70 of the interposer coupling assembly 50 and the GRIN lens of plug 12. The optical pathway of the interposer coupler assembly 50 also includes the length L of GRIN lens 70 and pathway through the optical signal turning element 60 (e.g., a non-GRIN material). The GRIN lens 70 may have any suitable length L. In one embodiment, the GRIN lens 70 has a length L (FIG. 7) that is shorter than one quarter pitch of the wavelength being communicated to the interposer coupler assembly 50. The interposer coupler assembly 50 has a height H that provides a low profile. By way of example, the height H may be 10 millimeters or less, and 6 millimeters or less in other embodiments, the height H may even be 3 millimeters or less.

Interposer IC 104 may include circuitry for converting signals such as converting optical signals to electrical signals (i.e., o-e conversion) and/or electrical signals to optical signals (i.e., o-e conversion) depending on the construction of the given interposer structure. By way of example, the optical signals from the interposer coupler assembly 50 may be received by a photodiode or the like that is part of interposer IC 104 for o-e conversion and further processing of the signal. Likewise, interposer IC 104 can transmit optical signals to the interposer coupler assembly 50 after e-o conversion of the electrical signals from the interposer IC 104 or other circuit. Interposer IC 104 may also include other suitable circuits for signal processing of the high-speed signals as desired. However, the optical coupling assembly 50 may be directly attached to any suitable IC or structure or have other applications. By way of example, this embodiment has the interposer coupler assembly 50 attached to an optional base 98. Base 98 may be used for aiding the assembly of the interposer coupler assembly 50 and used for aligning the optical channels of the interposer coupler assembly 50 with the interposer IC 104. Base 98 is formed from a material that allows the transmission of optical signals therethrough toward the interposer IC 104. Base 98 may also include alignment fiducials or other physical structure for aiding the alignment between the base 98 and the optical turning element 60 or the base 98 and the interposer IC 104.

Additionally, the base 98 may have more than one interposer coupler assembly 50 attached to the same such as shown in FIGS. 1-3. Although FIGS. 1-3 depicts two interposer coupler assemblies 50 on one of bases 98, the base may include one or more interposer coupler assemblies as desired for increasing the bandwidth capabilities. Other methods for increasing the bandwidth capabilities are also possible. For instance, the optical turning element 60 may have a larger width for attaching a plurality of GRIN lenses 70 to a single optical turning element 60, instead of having separate optical turning elements for each GRIN lens. FIGS. 14-18 show other possible arrangements for multiple GRIN lens arrays and likewise the optical plug assembly would have a complimentary arrangement. Suitable connector attachment saddles may be used with these concepts as appropriate.

FIG. 4 depicts a cross-sectional view of the optical connection between the interposer coupler assembly 50 and plug 12. Plug 12 transmits and receives optical signals from the interposer coupler assembly 50. Plug 12 includes an optical fiber organizer 14 having a plurality of bores 14a (FIG. 11) that are arranged in a precise array that may be symmetrical or asymmetrical as desired. Plug 12 will be discussed in more detail with respect to FIGS. 8-12 below. As an example, one of the optical pathways defined by the optical channels of interposer coupler assembly 50 will be discussed with respect to optical signals received from plug 12. The optical signal received from plug 12 first encounters window 90. The wavelengths transmitted pass through window 90 having a predetermined thickness and window 90 does not materially impact the transmission of the signal, but does alter the total length of the optical path for the optical coupling. Next, the optical signal passes into GRIN lens 70 that is in close proximity to window 90 and travels toward the optical signal turning element 60. The GRIN lens 70 has a suitable index profile and a suitable length that collimates the optical signal. Optical signal turning element 60 is formed from a suitable material such as LEXAN or the like that is transparent to the wavelength(s) being transmitted. Optical signal turning element 60 is used for turning the optical signal downward toward the interposer IC 104. By way of example, the optical signal turning element 60 may have a total internal reflection (TIR) surface 62 that is formed by the material/air interface of the optical signal turning element 60 as known. However, other suitable structures such as reflective optics are possible for turning optical signals toward the interposer IC 104.

Figure 5:
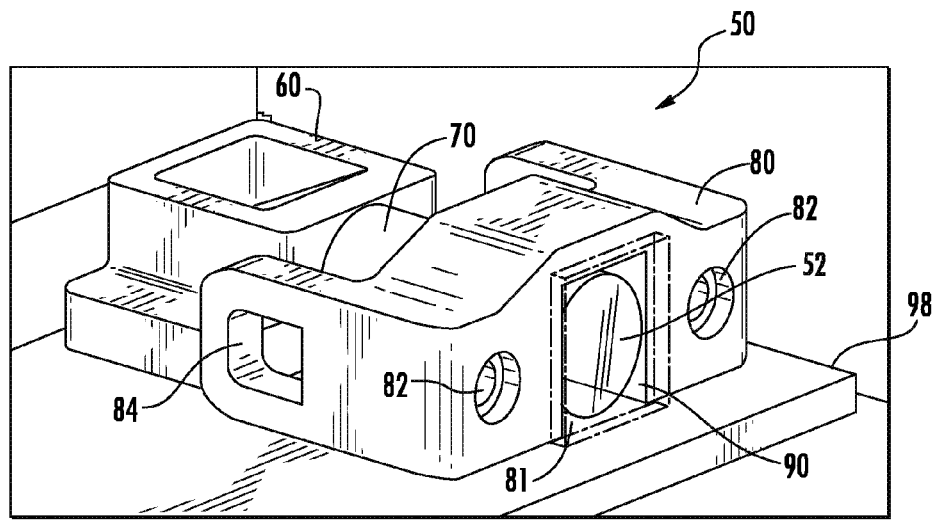
FIG. 5 is a perspective view of the interposer coupling assembly of interposer structure shown in FIGS. 1 and 2.
Figure 6:
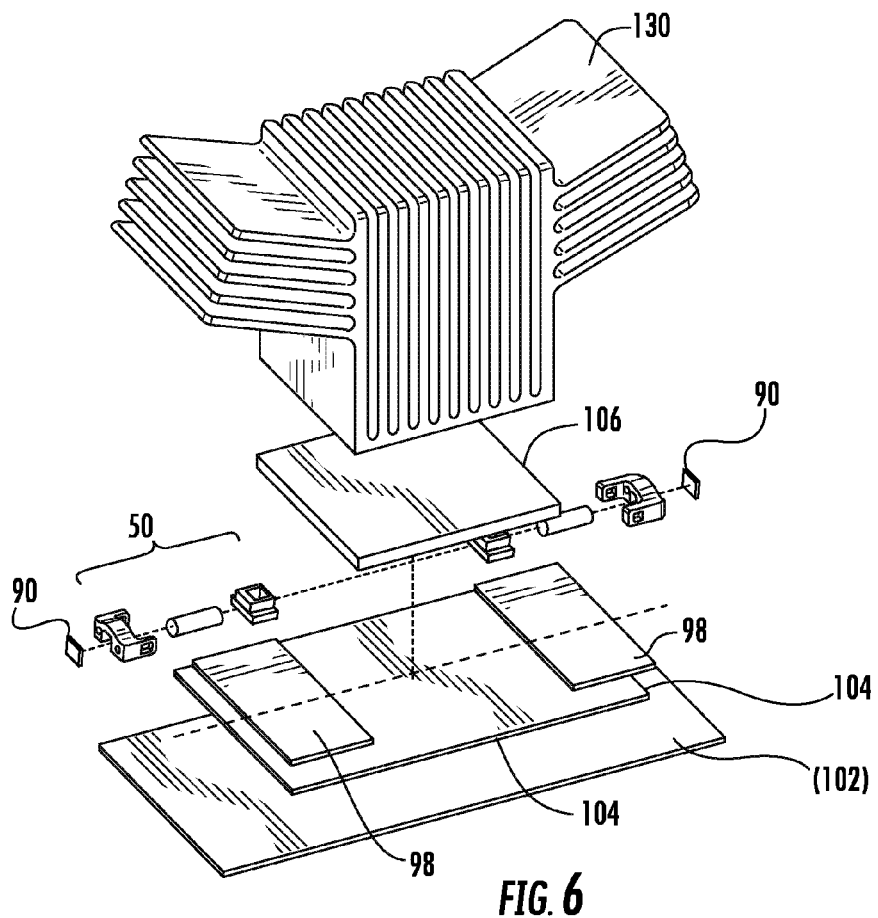
FIG. 6 is an exploded view of the interposer structure of FIGS. 1 and 2.

FIG. 5 is a perspective view of the interposer coupling assembly 50 of interposer structure 100 and FIG. 6 is an exploded view of the interposer structure 100. Interposer coupling assembly 50 includes an optical interface 52 with an optical alignment structure 82 for positioning the optical plug assembly 10 during mating with the interposer coupling assembly 50. As depicted, the GRIN lens 70 is attached to the optical signal turning element 60 for communicating signals through the assembly and the connector attachment saddle fits about a portion of the GRIN lens 70. The assembly of the interposer coupling assembly 50 will be discussed in more detail in relation with FIG. 7. A suitable complimentary assembly may be attached to the interposer coupling assembly 50 for forming an optical interconnection and the complimentary assembly such as a plug may also include a GRIN lens.

Using an optical interconnection that allows for mating and demating of the optical connection is desirable for manufacturing, assembly, disassembly, moves, adds or changes for the device. Moreover, separating the delicate integrated circuits with the precision mounted optics thereon from the forces associated with the complimentary optical plug assembly is beneficial. For instance, the optical plug assembly includes flexible waveguides such as optical fibers that can move and transition if external forces are applied, thereby inhibiting the transfer of forces to the integrated circuits. Further, a portion of the optical plug assembly may be anchored or strain-relieved to a rigid portion of the device to further isolate forces from the integrated circuits having the interposer coupling assembly. Consequently, any external forces are inhibited from being transmitted to the integrated circuits having the interposer coupling assembly.

The optical connection between the interposer coupling assembly 50 and the optical plug assembly 10 can provide a relatively large number of optical connections in a relatively small area (i.e., multiple optical channels passing through a single GRIN lens), thereby providing a large bandwidth connection without any of the concerns generally associated with electrical connections such as cross-talk, stray capacitance, etc. Further, the number and density of optical channels in the optical connection and thus the bandwidth may be increased by using optical fibers 16 with multi-core constructions instead of single core optical fibers; however, the optical channels need sufficient spacing for inhibiting optical cross-talk. In the simplest forms, the plug 12 of the optical connection has a single optical fiber attached and may be a single core or multi-core optical fiber; however, bandwidth may be greatly increased by attaching more than one optical fiber to the plug or by using an optical fiber having multiple cores. In other words, using a plug with a single multi-core optical fiber having eight cores may increase the bandwidth by a factor of eight compared with an optical fiber having one core. By way of further example, several multi-core optical fibers each having eight (8) cores for transmitting up to eight optical signals over each optical fiber can dramatically increase the bandwidth, but optical fibers may have any other suitable numbers of cores as desired. Further discussion on the arrangement of the optical channels is provided below with reference to FIGS. 13-18 and FIG. 19 depicts a simplified schematic representation of two optical paths formed by the optical connection between the interposer coupling assembly 50 and the optical plug assembly 10 similar to that shown in FIG. 4.

Providing the precise alignment between the optical pathways of the interposer IC 104 and the optical fibers 16 of optical plug assembly 10 presents alignment challenges. The alignment challenges also increase if multi-core optical fibers are used since issues such as rotational alignment also must be addressed to align the multiple cores in a single optical fiber. Further, the precise optical alignment needs to be maintained even with large temperature variations and may include the challenges of manufacturing if the interposer coupling assembly 50 is exposed to processes such as solder reflow. Consequently, the coefficient of thermal expansion (CTE) between the one or more materials of the interposer coupling assembly and the primary material of the interposer integrated circuit need to be matched to a given value (i.e., CTE delta between materials) for accommodating variations in temperature so that suitable optical connectivity is maintained. In one embodiment, the interposer integrated circuit 104 is formed or may include a silicon material such from a silicon wafer with the optical pathways formed on the silicon during a manufacturing process. In other words, different layers of the interposer integrated circuit are formed onto the silicon during the manufacturing process. Moreover, the CTE of each of the one or more materials of interposer coupling assembly should be within a given range (e.g., CTE delta) of the interposer integrated circuit CTE for maintaining optical performance during temperature variations and/or manufacturing processing.

Figure 7:
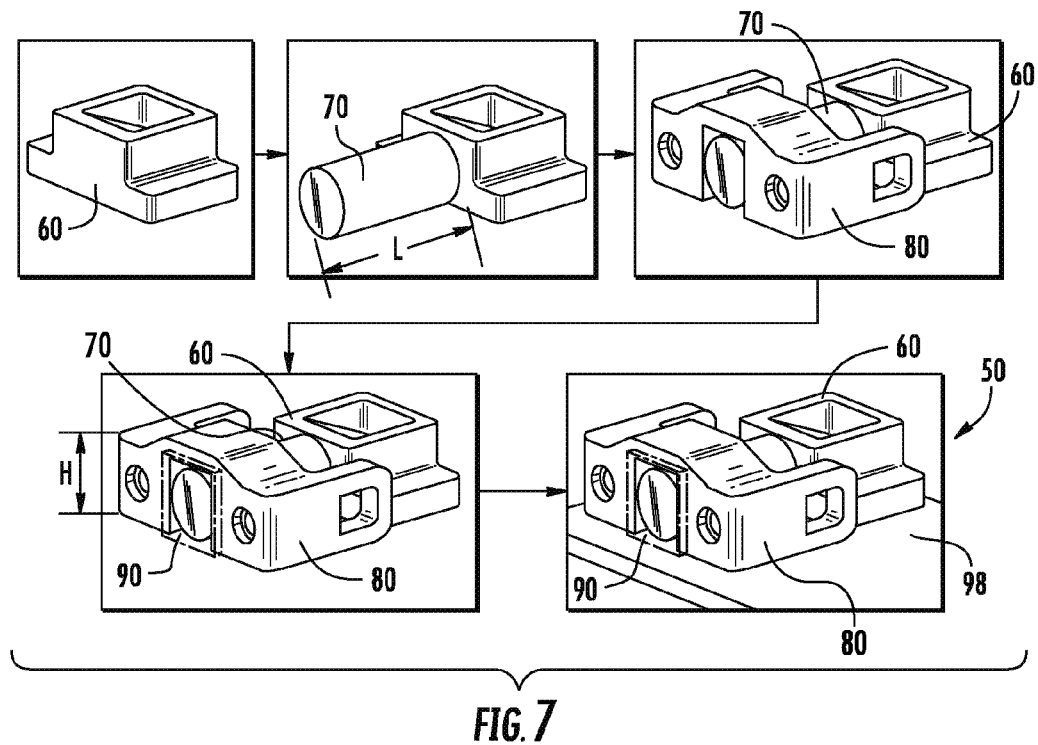
FIG. 7 depicts a series of images showing the construction of the interposer coupling assembly of the interposer structure.

FIG. 7 depicts a series of images showing the construction of the interposer coupling assembly 50. Although described in the context of making the interposer coupling assembly the method is applicable to making a coupling assembly for other applications as appropriate. The method of making the interposer coupling assembly 50 includes providing an optical signal turning element 60, and providing a GRIN lens 70. In one example, a first end of the GRIN lens 70 is attached to optical signal turning element 60 using a suitable adhesive. One suitable adhesive allows optical transmission therethrough and is robust enough to accommodate high-temperatures such as experienced during a solder reflow process. Consequently, the interposer coupling assembly 50 can be a portion of an assembly having an IC, circuit board or the like and the assembly can withstand a solder reflow process. The GRIN lens 70 is aligned to the optical signal turning element 60 at a suitable location on element 60. If the optional window 90 is used in the assembly it may be attached to the GRIN lens 70 at any time using a suitable adhesive such as the same adhesive used for attaching the GRIN lens 70. As shown, the window 90 is attached to a second end of the GRIN lens 70. Likewise, if the optional base 98 is being used, the sub-assembly of the optical signal turning element 60 and GRIN lens 70 may be aligned and attached to the provided base 98 using a suitable adhesive as discussed herein. The connector attachment saddle 80 is then aligned about the GRIN lens 70 and secured to base 98 and/or window 90 if used and the GRIN lens 70. The method of making the interposer coupling assembly 50 may include other steps and/or components as desired. Once assembled, the interposer coupling assembly 50 may be used on any suitable assembly. In other methods of making, the interposer coupling assembly 50 may be constructed directly on the desired device in a similar fashion.

If the interposer coupling assembly 50 will experience a solder reflow operation, then it is desirable to have a matched thermal response between one or more materials of the interposer coupling assembly 50 and the interposer integrated circuit 104 for maintaining a proper optical alignment between optical paths on the interposer coupling assembly 50 and interposer integrated circuit 104 during the process. Stated another way, significant changes in temperature during the process will not cause large stresses if the CTE of between of the primary material (e.g., silicon) of the interposer integrated circuit and interposer coupling assembly 50 material are not exactly the same (i.e., there is a CTE delta between materials) because part of the interposer coupling assembly 50 may be fixed to the interposer integrated circuit 104 the part will expand or contract at a similar rate and reduce stress on the components and the attachment.

By way of example, the interposer coupling assembly 50 is formed from one or more materials that have a CTE that is matched to the CTE primary material for the interposer integrated circuit, but in practice the materials will be different and there will be a CTE delta. However, the interposer coupling assembly 50 materials should be selected to provide the desired performance and material characteristics along with an acceptable CTE delta between the interposer coupling assembly 50 and the primary material of the interposer integrated circuit. By way of example, an acceptable CTE delta between one or more of the interposer coupling assembly 50 materials and the primary material of the interposer integrated circuit at ambient conditions is about $4.0 \times 10^{-6 \circ}$ C. ($\Delta$mm/mm) in one embodiment, about $2.0 \times 10^{-6 \circ}$ C. ($\Delta$mm/mm) in another embodiment, and about $1.0 \times 10^{-6 \circ}$ C. ($\Delta$mm/mm) in a further embodiment. A typical silicon material is isotropic and has a CTE value of $2.6 \times 10^{-6 \circ}$ C. ($\Delta$mm/mm) at ambient conditions. Thus, for the example given the CTE of one or more of the interposer coupling assembly 50 materials is $2.6 \times 10^{-6 \circ}$ C. $\pm 1.0 \times 10^{-6 \circ}$ C. at ambient conditions. Likewise, the base 98 may also have a CTE that is matched to the primary interposer integrated circuit 104 if used.

An example of a suitable material for the connector attachment saddle 60 is a polymer that includes a filler to help maintain the desired CTE delta with the interposer integrated circuit 104 material. By way of example, the filler of the polymer material has a relatively high percentage. For instance, of 40 percent or more by weight, or 70 percent or more by weight. An example of a suitable polymer having a glass filler of 70 percent or more by weight. Other materials besides glass are possible for the filler material(s) such as ceramics like aluminosilicate glass-ceramic, borosilicate glass, quartz, and the like. Of course, non-filled materials may be used for the connector attachment saddle 60 if they have suitable characteristics and properties. As a non-limiting example of a low CTE non-polymer material that may be used for the connector attachment saddle 60 is a nickel iron alloy available under the tradename INVAR (e.g., 64FeNi).

Additionally, the interposer coupling assembly 50 may be formed by materials that have a CTE that is generally matched to the CTE of the interposer integrated circuit 104. By way of example, the CTE of the optical signal turning element 60 and the CTE of the interposer integrated circuit 104 are matched with a delta between CTE of the optical signal turning element 60 material CTE that is within 40% percent of the interposer integrated circuit material CTE, but other values for CTE matching are possible and may be influenced by design specifics.

Figure 8:
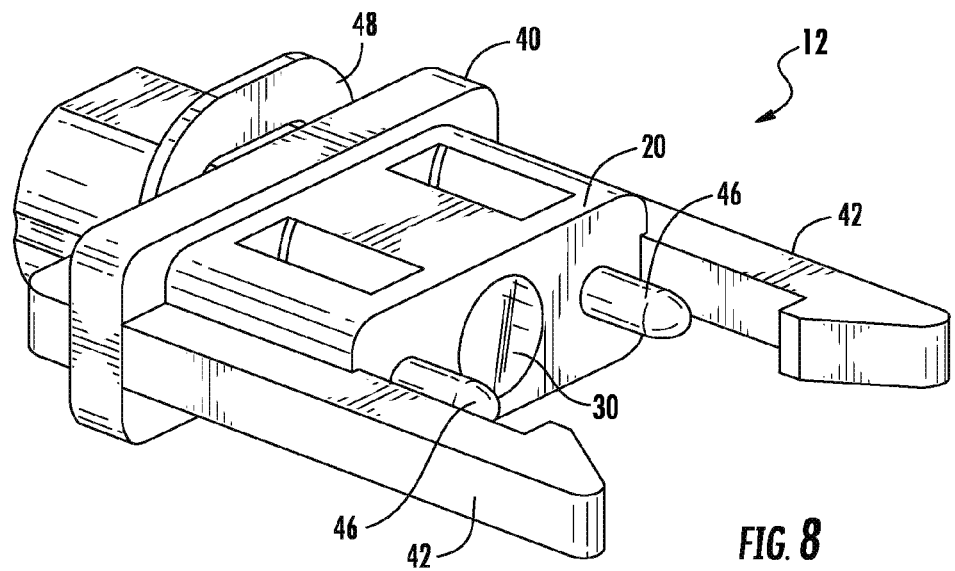
FIG. 8 is a perspective view of the plug of the optical plug assembly depicted in FIG. 1.
Figure 9:
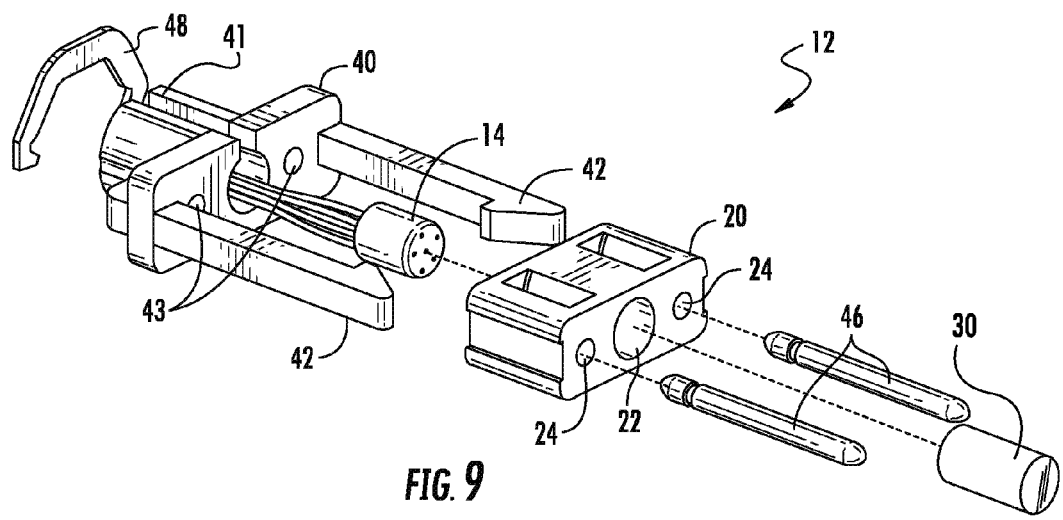
FIG. 9 is an exploded view of the plug depicted in FIG. 8.

FIG. 8 is a perspective view of the plug 12 of the optical plug assembly 10 and FIG. 9 is an exploded view of the plug 12. As best shown in FIG. 9, plug 12 includes an optical fiber organizer 14, an alignment body 20, a GRIN lens 30, and an attachment body 40. Alignment body 20 includes a passageway 22 that extends from the rear side to the front side of the alignment body 20. Other plug embodiments may include several passageways 22 in any suitable arrangement if more than one GRIN lens was used for the plug. Plug 12 also includes one or more optional alignment pins 46 and an optional retainer 48 for securing the alignment pins 46. Stated another way, the alignment pins 46 are not necessary for plug 12 since the alignment pins may instead be a portion of interposer coupling assembly 50. Alignment body 20 may also optionally include one or more alignment pin bores for receiving the optional alignment pins 46. If used, the alignment pin bores 24 extend from a front end to a rear end of the alignment body 20. As shown in FIG. 9, attachment body 40 may also include one or more alignment pin bores 43. Alignment pin bores 43 may extend through a portion of the attachment body 40 so that the alignment pins 46 can extend therethrough and be secured by retainer 48 as shown in FIG. 8. Attachment body 40 may also include one or more retention features 42 for securing plug 12 to the interposer coupling assembly 50. In this embodiment, the retention features 42 are resilient arms having protrusions for cooperating with attachment features 84 configured as openings on the connector attachment saddle 80 of the interposer coupling assembly 50.

Figure 10:
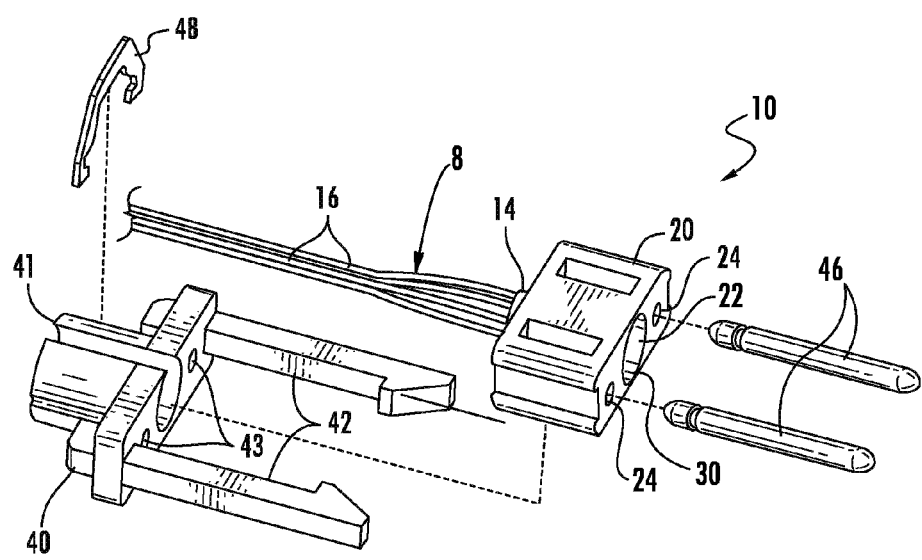
FIG. 10 is a perspective view of a partially assembled optical plug assembly depicted in FIG. 9.

FIG. 10 is a perspective view of a partially assembled optical plug assembly 10 having a GRIN assembly 8 (FIGS. 11 and 12) inserted into an alignment block 20. The GRIN assembly 8 is positioned so that the front face of GRIN lens 30 is positioned near the front surface of alignment body 20 and may be secured in a suitable manner such as using an adhesive or the like. The positioning of GRIN assembly 8 may use a passive or active alignment for positioning the cores of the optical fibers to the alignment body 20 as desired. In this embodiment, attachment body 40 includes an open side 41 so that the optical fibers 16 may be inserted into the attachment body 40 so alignment body 20 may be positioned between retention features 42. Open side 41 is optional and allows optical fibers 16 to be attached to optical fiber organizer 14 without having to thread the optical fibers through a bore of the attachment body 40. Then, alignment pins 46 may be inserted into alignment pin bores 24 of alignment body 20 and alignment pin bores 43 of attachment body 40 so alignment pins 46 are exposed at the back of attachment body 40. Thereafter, alignment pins 46 may be secured by sliding retainer 48 about the alignment pins 46.

Figure 11:
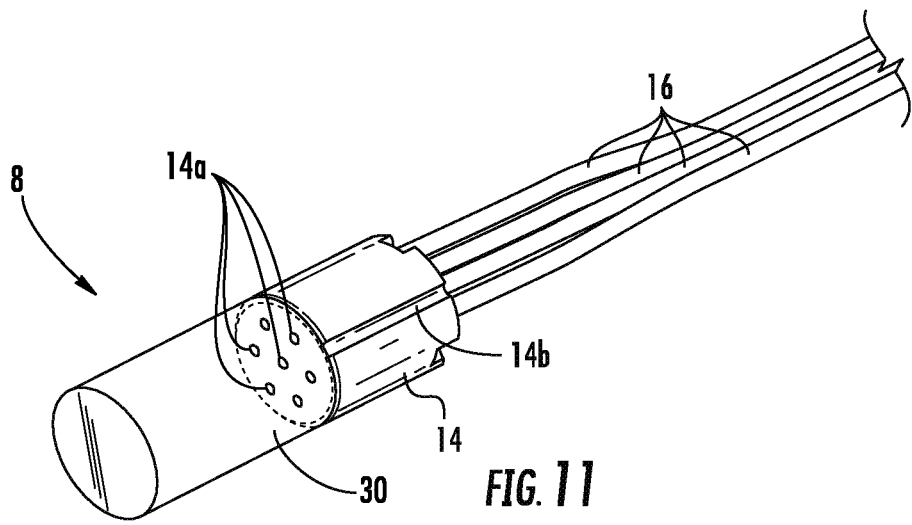
FIGS. 11 and 12 respectively are a front and rear perspective view of a GRIN assembly used in the optical plug assembly depicted in FIG. 10.
Figure 12:
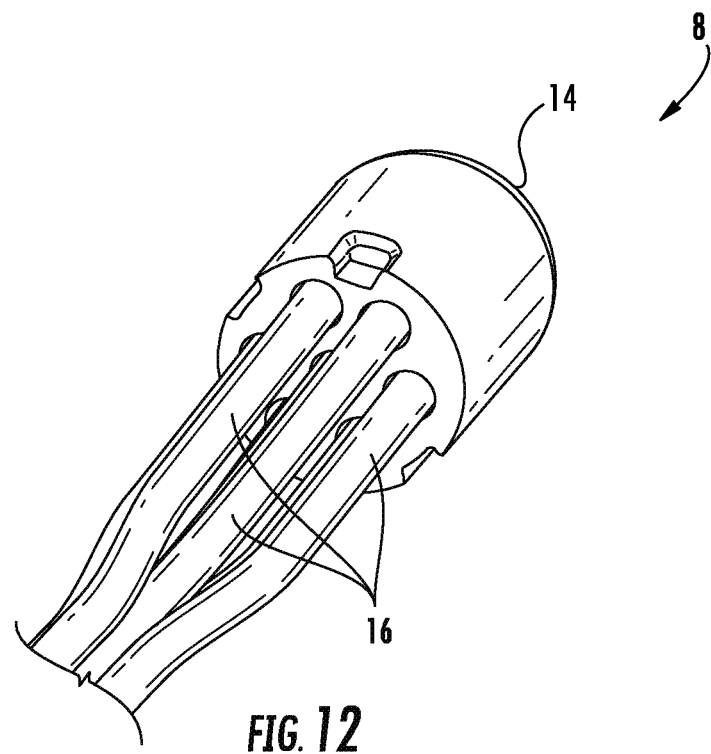

FIGS. 11 and 12 respectively are a front and rear perspective view of the GRIN assembly 8 used in the optical plug assembly 10. As depicted, the optical fiber organizer 14 include the plurality of bores 14a arranged in an array that extend from a front end to a rear end of the optical fiber organizer 14 for receiving one or more optical fibers 16 therein. As non-limiting examples, the arrays may be arranged as linear and/or circular arrays that correspond to the optical pathways of the interposer IC 104. In one embodiment, optical fibers 16 are multi-core optical fibers, but other types of optical fibers are possible. In other embodiments, the optical fiber organizer 14 may include a single bore 14a for receiving a single optical fiber if desired. If multi-core optical fibers are used, then the rotational position of each of the optical fibers 16 should be properly aligned within the individual bores 14a of the optical fiber organizer 14 so that the multiple cores are in the desired position with respect to optical paths of interposer coupling assembly 50. After the optical fibers 16 are secured to the optical fiber organizer 14, the ends of the optical fibers 16 may be finished using any suitable method such as a laser processing and/or a mechanical polish as desired. Thereafter, the GRIN lens 30 may be attached to the end of the optical fiber organizer 14 using a suitable adhesive for optical transmission. Other variations of the optical fiber organizer 14 are also possible according to the concepts disclosed herein such as varying the shape such as square or other shapes, different arrangement for the alignment structure, etc. Further, the optical fiber organizer 14 may include one or more keys or keyways 14b on the perimeter for cooperating with the passageway 22 of the alignment body 20 for providing coarse or fine alignment thereto.

Figure 13:
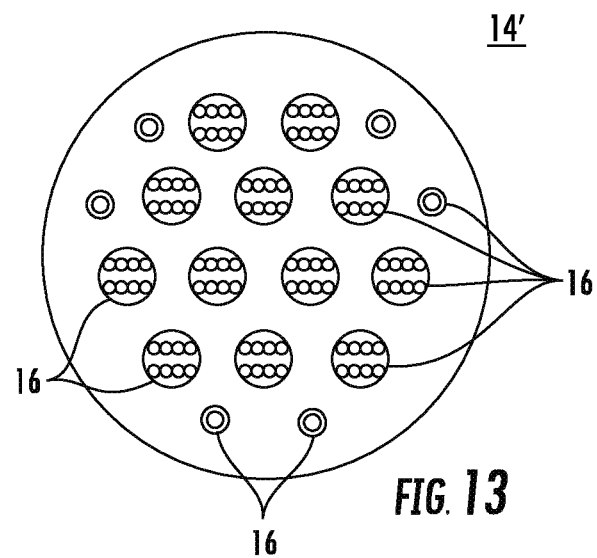
FIG. 13 depicts an end view of a representative optical fiber organizer having an optical fiber array that is similar to the optical fiber organizer of the optical plug assembly depicted in FIG. 8.

There are many different optical fiber array arrangements that may be used with the concepts disclosed. FIG. 13 depicts an end view of a representative optical fiber organizer 14' similar to the optical fiber organizer 14 showing an array that may be used with a suitable optical plug assembly 10. As depicted, the optical fiber organizer 14' has a plurality of bores 14a that extend from a front end to a rear end that receive a plurality of optical fibers 16. As shown, optical fiber organizer 14' include a plurality of optical fibers 16. Specifically, the optical fibers 16 include both multi-core optical fibers and single core optical fibers. The multi-core optical fibers each have eight cores, but optical fibers may have a different number of cores as desired. Moreover, the plurality of bores 14a have a suitable spacing. In this embodiment, the spacing of adjacent bores is about 375 microns, but other suitable spacing arrangements are possible.

Figure 14:
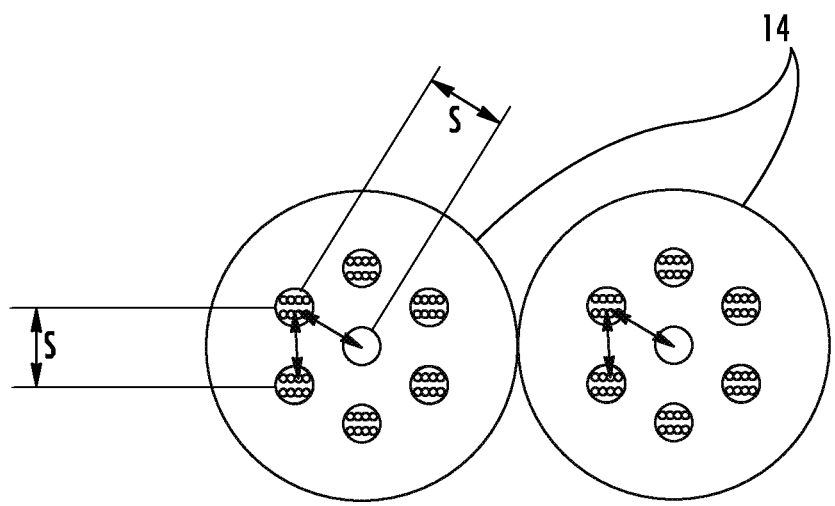
FIGS. 14-18 depict end views of representative optical fiber arrays that may be used with other plugs having multiple optical fiber organizers for receiving multiple optical fibers.

FIGS. 14-18 depict end views of representative optical fiber arrays that may be used with other plugs having multiple optical fiber organizers that each receive multiple optical fibers. Stated another way, the alignment body of the other plugs would have other shapes for the passageway that receives the GRIN assemblies or the alignment body would have multiple passageways for receiving the GRIN assemblies. FIG. 14 shows another array having two smaller outer diameter optical fiber organizers arranged in a side-by-side relationship and a different center-to-center spacing between adjacent optical fibers. In this embodiment, the center-tocenter spacing S between adjacent optical fibers is 450 microns. Other arrangement for the center-to-center spacing S for the array are also possible. Equal spacing between fiber organizers/optical fibers provides some symmetry, but the spacing can vary as desired.

Figure 15:
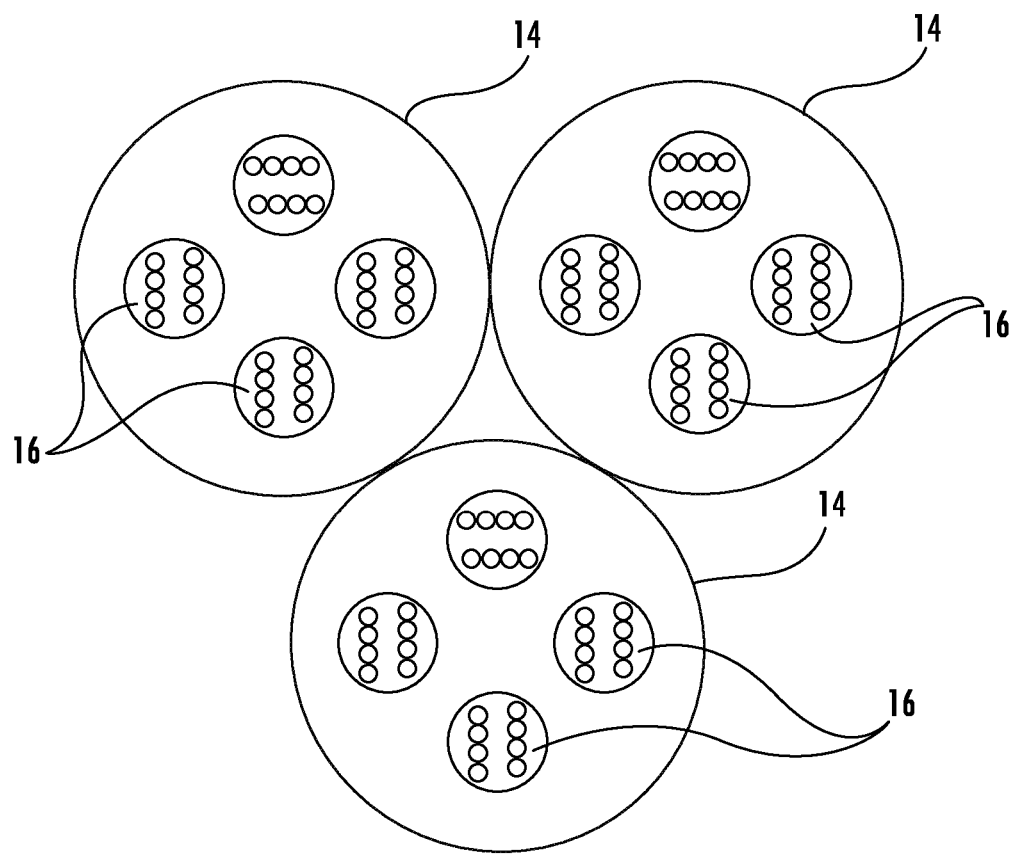
Figure 16:
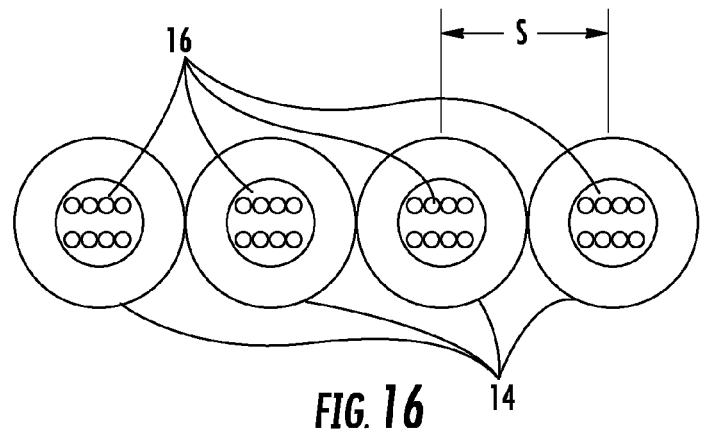
Figure 17:
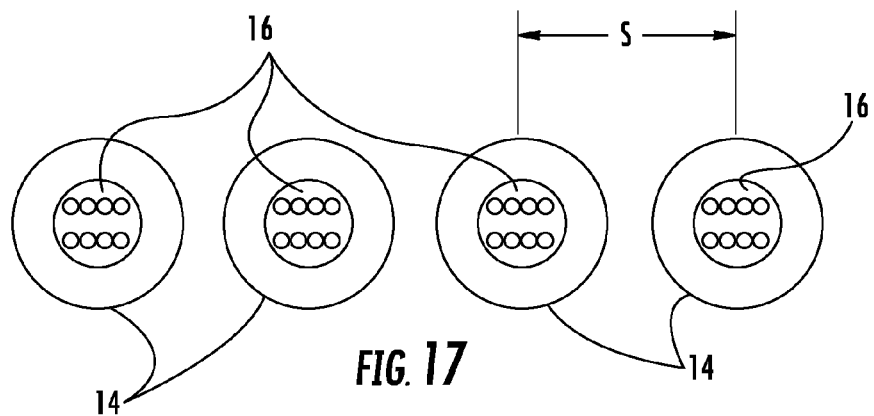
Figure 18:
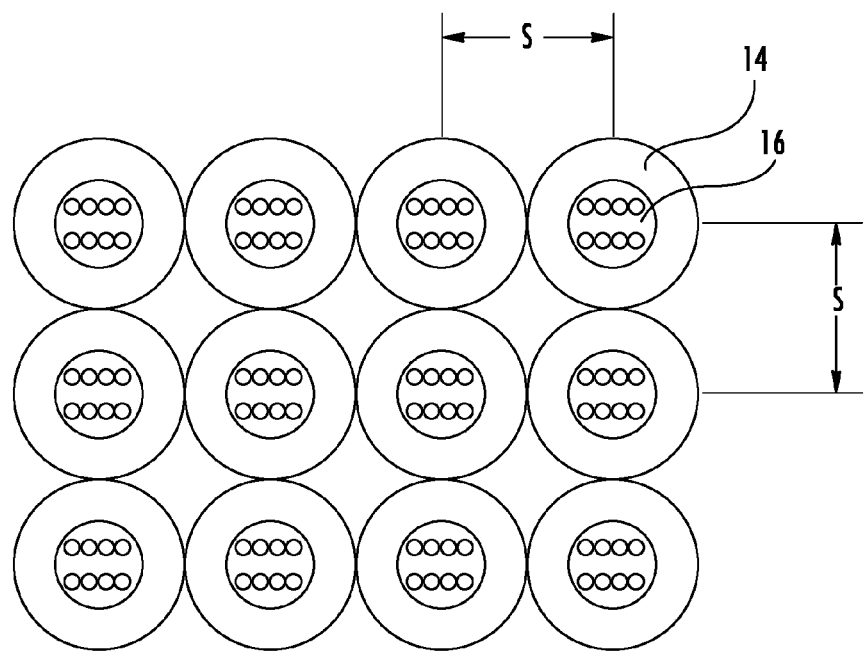

FIG. 15 depicts another array having three optical fiber organizers 14 arranged in a hex-packed configuration with each optical fiber organizer having four multi-core optical fibers. Moreover, any of the optical fiber organizer arrangements may have any suitable number of optical fibers therein. FIG. 16 is another array having four tightly space optical fiber organizers 14 arranged in a linear array with each optical fiber organizer having a single multi-core optical fiber 16. FIG. 17 is yet another array having four spaced apart optical fiber organizers 14 arranged in a linear array with each optical fiber organizer having a single multi-core optical fiber. Of course, the optical fiber organizer arrangements may have other 1×N arrangement such as six, eight, etc. optical fiber organizers arranged in a linear array. FIG. 18 is still another array having multiple rows of optical fiber organizers 14 arranged in a linear N×M array with each optical fiber organizer having a single multi-core optical fiber 16. The multiple rows of optical fiber organizers may be tightly packed together or spaced apart as desired. These are just a few of the many different arrangements that are possible according to the concepts disclosed.

Figure 19:
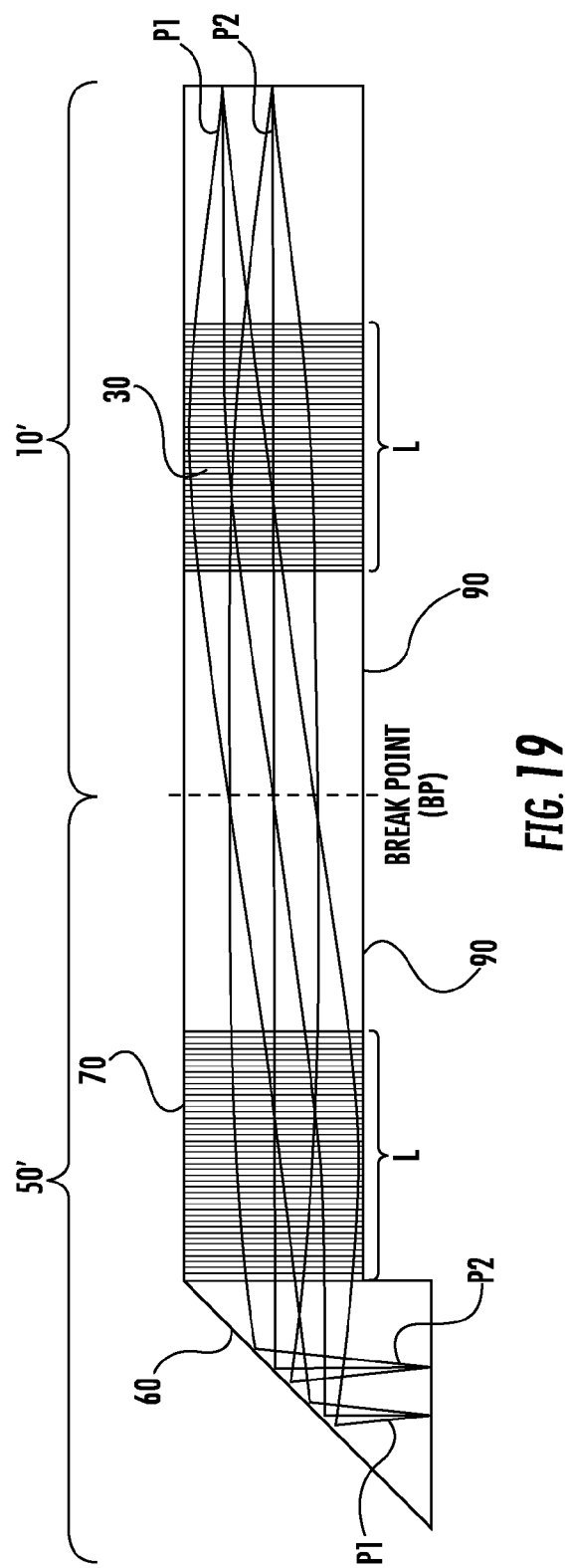
FIG. 19 depicts a simplified schematic representation of two optical paths formed by the optical connection between the interposer coupling assembly and the optical plug assembly similar to that shown in FIG. 4.

FIG. 19 depicts a simplified schematic representation of two optical paths P1,P2 using the GRIN lenses in the optical connection between the interposer coupling assembly 50' and the optical plug assembly 10' similar to the arrangement shown in FIG. 4. The break point BP (i.e., mating interface) between the assemblies is shown. To enable precise turning of the optical signal toward the interposer integrated circuit, the GRIN lenses used for interposer coupling assembly 50' and optical plug assembly 10' each have a respective length L that is less than a quarter pitch (e.g., less than 0.25 P). The pitch of the lens is the length for a full sinusoidal period that the ray would traverse in the lens. By way of example, the GRIN lens would have a length L between 0.5 millimeters (mm) and 5 mm. Further, as an example the focal length of one GRIN lens is between 0.3 mm and 3 mm, which expands the beam (i.e., optical signal) to have a collimated space beam diameter of between about 60 microns and 450 microns. Thus, a GRIN lens having an outer diameter of about 2 mm or less can accommodate up to 20 optical channels from multi-core optical fibers. As shown in FIG. 19, the distance between GRIN lens 30 and GRIN lens 70 is filled by air or non-GRIN material such as window 90, and the length of the non-GRIN material is constrained by telecentric conditions in both object space and image space. The mating surfaces of the interposer coupling assembly 50 and the plug 12 may be angle polished if desired to increase return loss. Further, both the non-GRIN material and the GRIN lens can have an anti-reflection coating for reducing back reflections.

There may be practical limits to the number of optical channels that a single GRIN lens transmits and receives. For instance, when a shorter length GRIN lens is used, the focal length of the assembly is shorter, the expanded beam size in collimated space is smaller, and the GRIN lens aperture size is also smaller. The smaller aperture size provides a smaller field of view such that a fewer number of multi-core optical fibers can be coupled using a single GRIN lens. On the other hand, to maintain the same fiber coupling efficiency, smaller expanded beam size in collimated space provides a larger tolerance for lateral offsets, but a smaller tolerance for angular misalignments. Thus, if larger angular misalignment tolerances are desired, then a short focal length connector is needed such as about 1.5 mm as an example, which means a smaller number of multi-core optical fibers can be coupled using common optics. By way of example, a GRIN lens having a focal length of 0.6 millimeters (mm), and an outer diameter of 0.35 mm may be used for coupling one multi-core optical fiber, and multiple GRIN lenses can be used such as shown in FIGS. 14-18. Consequently, assemblies with multiple GRIN lenses are more tolerant of angular misalignments than assemblies having a configuration that uses a single larger diameter and longer focal length GRIN lens. Illustratively, FIG. 13 having a single lens configuration that couples twelve multi-core optical fibers using a GRIN lens with a 1.8 mm outer diameter and a focal length of 2 mm is more susceptible to angular misalignments compared with configurations that use smaller GRIN lenses that couple fewer multi-core optical fibers.

Figure 20:
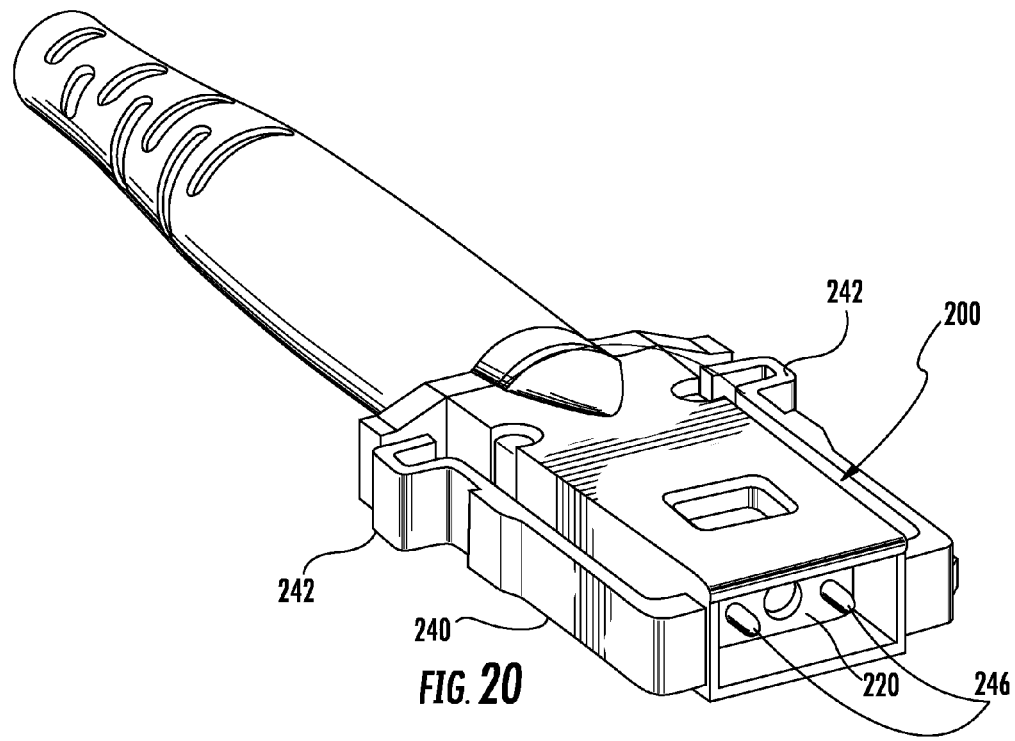
FIGS. 20 and 21 are perspective views of another optical plug that may be used at a second end of the optical plug assembly for coupling to an adapter panel.
Figure 21:
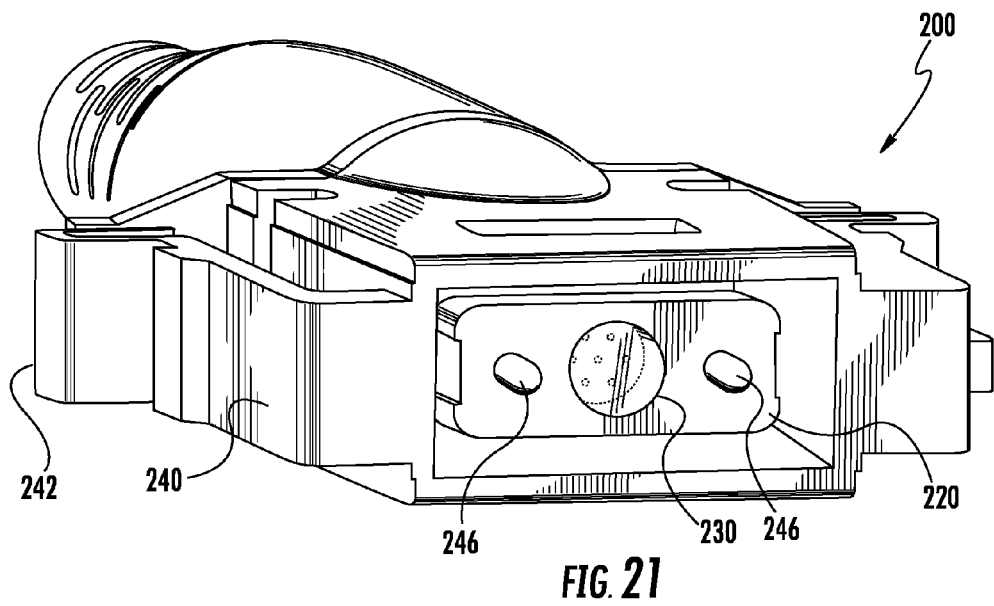
Figure 22:
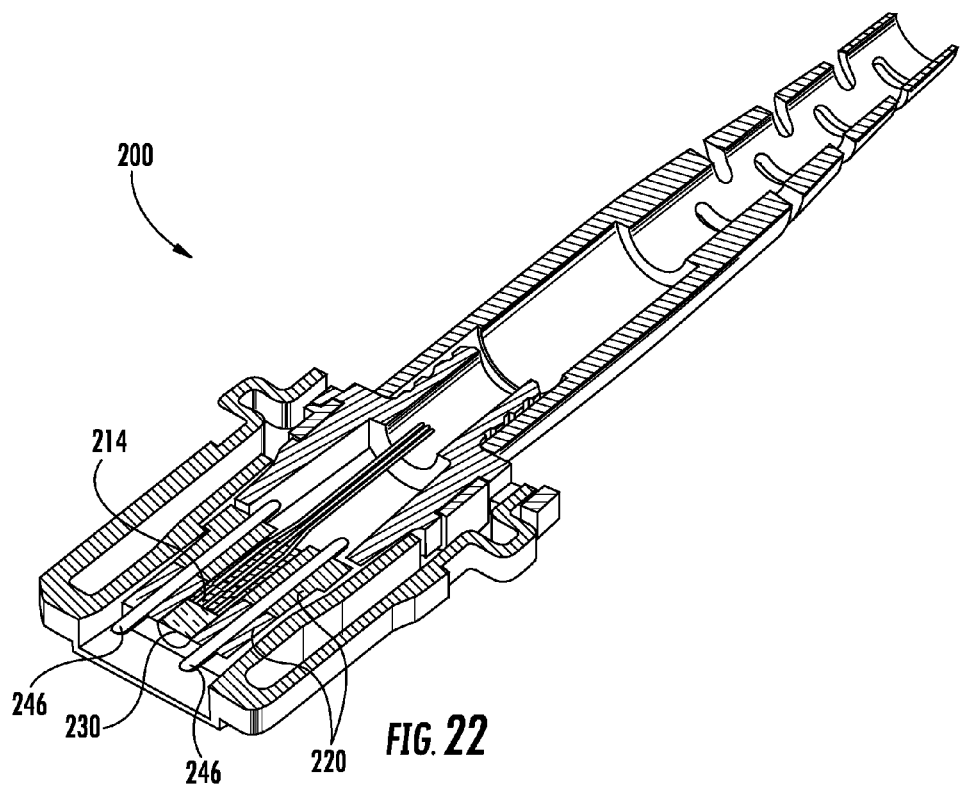
FIG. 22 is a cross-sectional view of the optical plug of FIGS. 20 and 21.

FIGS. 20 and 21 are perspective views of another optical plug 200 that may be used at a second end of the optical plug assembly 10 for coupling to an adapter panel 300 (FIG. 23) and FIG. 22 is a cross-sectional view of the optical plug 200.

Figure 23:
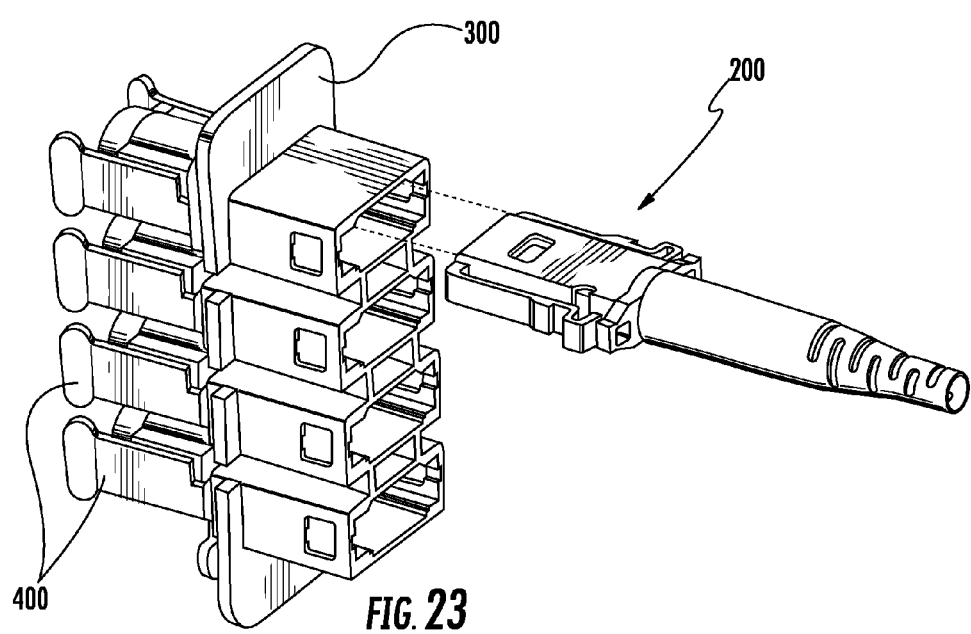
FIG. 23 is a perspective view of the optical plug being presented to an adapter for mating with the complimentary optical assembly.
Figure 24:
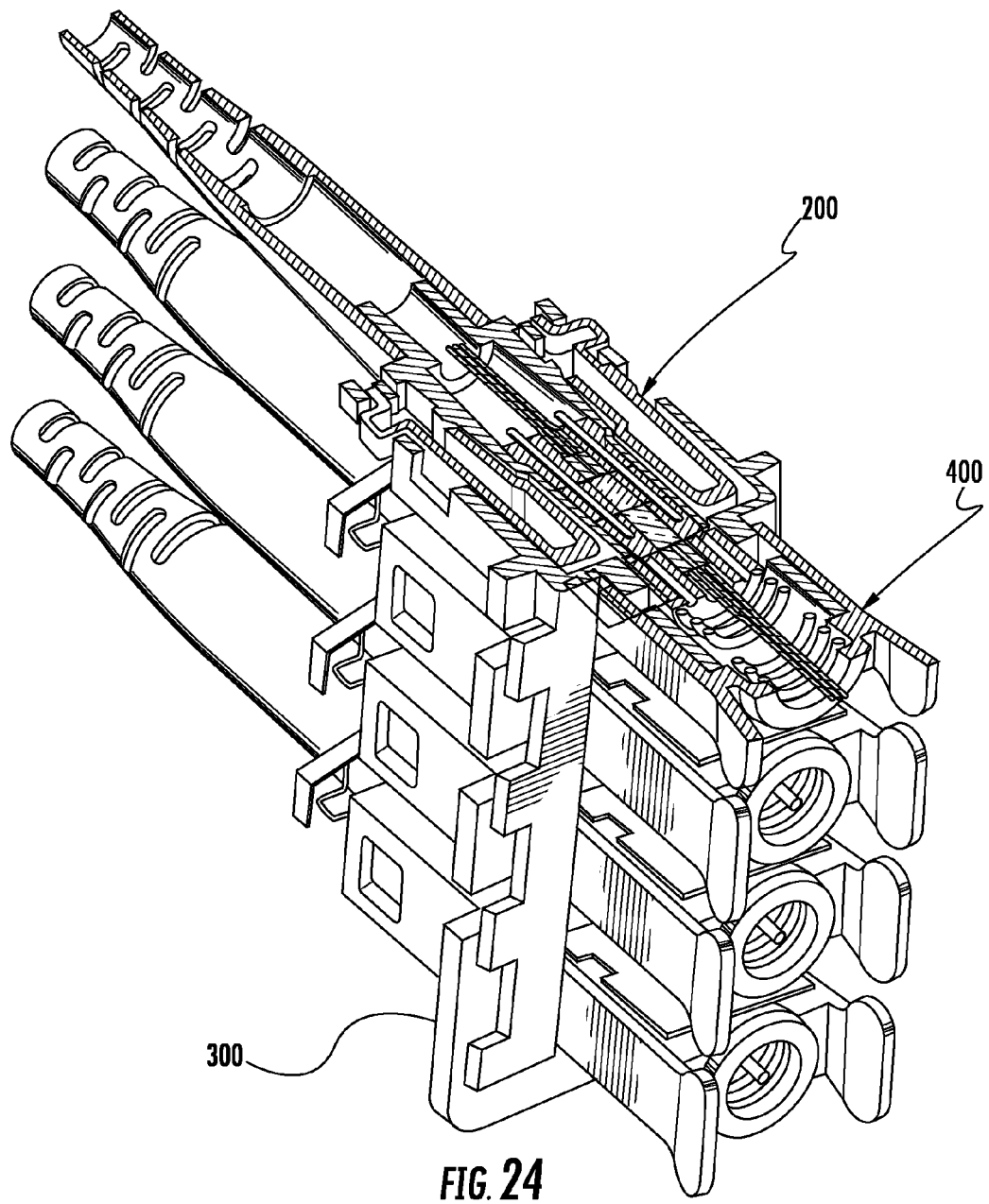
FIG. 24 is a partial cross-sectional view of the optical plug of FIG. 23 connected with its complimentary optical assembly using an adapter.

As best shown in FIG. 23, plug 200 includes a GRIN lens 230 has a similar construction as plug 12 and includes an optical fiber organizer 214, an alignment body 220, and an attachment body or housing 240 for coupling plug 200. Alignment body 220 includes a passageway that extends from the rear side to the front side of the alignment body 220. Other plug embodiments may include several passageways 22 in any suitable arrangement if more than one GRIN lens was used for the plug. Plug 200 also includes one or more optional alignment pins 246 and an optional retainer for securing the alignment pins 246. Like plug 12, the alignment pins 246 are not necessary for plug 200 since the alignment pins may instead be a portion of complimentary assembly 400 (FIGS. 23 and 24) if desired. Alignment body 220 may also optionally include one or more alignment pin bores for receiving the optional alignment pins 246. If used, the alignment pin bores extend from a front end to a rear end of the alignment body 20. Housing 240 may also include one or more retention features 242 for securing plug 200 to the adapter 300 as shown in FIG. 23. In this embodiment, the retention features 242 are resilient arms having protrusions for engaging adapter 300. FIG. 23 is a perspective view of plug 200 being presented to an adapter 300 for mating with the complimentary optical assembly 400 and FIG. 24 is a partial cross-sectional view of the mated plug 200 and its complimentary optical assembly 400 within an adapter 300.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An interposer coupling assembly for communicating optical signals to an integrated circuit, comprising:
   a connector attachment saddle having an optical alignment structure;
   an optical pathway that includes a GRIN lens, the GRIN lens having a diameter suitable for receiving multiple optical signals; and
   an optical signal turning element adjacent to the GRIN lens.

2. The interposer coupling assembly of claim 1, wherein the GRIN lens is attached to the optical signal turning element.

3. The interposer coupling assembly of claim 1, wherein the optical signal turning element includes a total internal reflection surface.

4. The interposer coupling assembly of claim 1, further including a base wherein the interposer coupling assembly is attached to the base.

5. The interposer coupling assembly of claim 1, the interposer coupling assembly being in communication with an interposer integrated circuit.

6. The interposer coupling assembly of claim 5, wherein the interposer coupling assembly is formed from one or more materials with respective coefficients of thermal expansion (CTE) and the interposer integrated circuit is formed from a material with a second CTE, and the CTE delta between each of the one or more materials of the interposer coupling assembly and the interposer integrated circuit is $4.0 \times 10^{-6}$° C. ($\Delta$mm/mm) or less at ambient conditions.

7. The interposer coupling assembly of claim 1, further including a window adjacent to the connector attachment saddle.

8. The interposer coupling assembly of claim 1, the interposer coupling assembly having a height of 6 millimeter or less.

9. The interposer coupling assembly of claim 1, the GRIN lens having a length that is shorter than one quarter pitch of the wavelength being communicated to the optical interface.

10. The interposer coupling assembly of claim 1, wherein the optical alignment structure includes one or more optical fiber alignment features for aligning optical signals to the interposer coupling assembly.

11. The interposer coupling assembly of claim 10, wherein the optical alignment structure includes one or more bores.

12. The interposer coupling assembly of claim 1, the interposer coupling assembly having an optical plug assembly attached to the connector attachment saddle.

13. The interposer coupling assembly of claim 1, the optical plug assembly being attached to the interposer coupling assembly, the optical plug assembly having one or more multicore optical fibers and a GRIN lens.

14. An optical plug assembly for optical connection with an interposer coupling assembly, comprising:
   an optical fiber organizer having at least one rotational orientation guide and at least one bore for receiving an optical fiber;
   a GRIN lens;
   an attachment body; and
   an alignment body for receiving a portion of the optical fiber organizer and a portion of the GRIN lens.

15. The optical plug assembly of claim 14, the alignment body including one or more alignment pin bores.

16. The optical plug assembly of claim 15, further including one or more alignment pins.

17. The optical plug assembly of claim 14, the attachment body having one or more retention features.

18. The optical plug assembly of claim 17, the one or more retention features being resilient arms.

19. The optical plug assembly of claim 14, the attachment body having one or more alignment pin bores.

20. The optical plug assembly of claim 14, further including an alignment pin mechanism.

21. The optical plug assembly of claim 14, the optical fiber organizer having a plurality of bores for receiving optical fibers, the plurality of bores being arranged in an array.

22. The optical plug assembly of claim 14 having a plurality of optical fibers attached to the optical fiber organizer.

23. The optical plug assembly of claim 22, the plurality of optical fibers being multicore optical fibers.

24. An assembly for communicating optical signals to an integrated circuit, comprising:
   an interposer coupling assembly having a connector attachment saddle with an optical alignment structure, an optical pathway that includes a GRIN lens, and an optical signal turning element adjacent to the GRIN lens;
   interposer integrated circuit;
   a base disposed on the interposer integrated circuit, wherein the base is formed of a material that allows a transmission of optical signals toward the interposer integrated circuit, and the interposer coupling assembly is attached to the base; and
   an optical plug assembly being attached to the interposer coupling assembly, the optical plug assembly having one or more multicore optical fibers and a GRIN lens.

25. An interposer coupling assembly for communicating optical signals to an integrated circuit, comprising:
   a connector attachment saddle having an optical alignment structure, wherein the optical alignment structure includes one or more optical fiber alignment features for aligning optical signals to the interposer coupling assembly;
   an optical pathway that includes a GRIN lens;
   an optical signal turning element adjacent to the GRIN lens;
   a window adjacent to the connector attachment saddle,
   an interposer integrated circuit being in communication with the interposer coupling assembly; and
   a base disposed on the interposer integrated circuit, wherein the connector attachment saddle and the optical signal turning element are disposed on the base, and the base is formed of a material that allows the transmission of optical signals therethrough toward the interposer integrated circuit.

26. The interposer coupling assembly of claim 25, wherein the GRIN lens is attached to the optical signal turning element.

27. The assembly of claim 24, further comprising an electro-optical integrated circuit disposed on the interposer integrated circuit.

* * * * *